United States Patent
Winslow et al.

(10) Patent No.: US 7,776,974 B2
(45) Date of Patent: Aug. 17, 2010

(54) OLEFIN POLYMERIZATION PROCESS

(75) Inventors: Linda N. Winslow, Cincinnati, OH (US); Sebastian Joseph, Mason, OH (US); Sandor Nagy, Naperville, IL (US); Natalia Nagy, Naperville, IL (US); Barbara M. Tsuie, Cincinnati, OH (US); Charles H. Gates, Lake Jackson, TX (US)

(73) Assignee: Equistar Chemicals, LP, Houston, TX (US)

( * ) Notice: Subject to any disclaimer, the term of this patent is extended or adjusted under 35 U.S.C. 154(b) by 267 days.

(21) Appl. No.: 12/150,724

(22) Filed: Apr. 30, 2008

(65) Prior Publication Data

US 2009/0275711 A1 Nov. 5, 2009

(51) Int. Cl.
*C08F 2/00* (2006.01)
*C08F 4/6592* (2006.01)
*C08F 4/64* (2006.01)
*B01J 31/22* (2006.01)

(52) U.S. Cl. .................. 526/65; 526/160; 526/161; 526/165; 526/170; 526/172; 526/348; 526/943

(58) Field of Classification Search ............ 526/65, 526/160, 161, 165, 170, 172, 348, 943
See application file for complete search history.

(56) References Cited

U.S. PATENT DOCUMENTS

| | | |
|---|---|---|
| 4,357,448 A | 11/1982 | Tsubaki et al. |
| 5,153,157 A | 10/1992 | Hlatky et al. |
| 5,198,401 A | 3/1993 | Turner et al. |
| 5,241,025 A | 8/1993 | Hlatky et al. |
| 5,414,180 A | 5/1995 | Geerts et al. |
| 5,648,440 A | 7/1997 | Sugano et al. |
| 6,211,311 B1 | 4/2001 | Wang et al. |
| 6,232,260 B1 | 5/2001 | Nagy et al. |
| 6,451,724 B1 | 9/2002 | Nifant'ev et al. |
| 6,486,270 B1 | 11/2002 | Garrison et al. |
| 6,559,251 B1 | 5/2003 | Wang et al. |
| 6,566,450 B2 | 5/2003 | Debras et al. |
| 6,908,972 B2 | 6/2005 | Tsuie et al. |
| 6,921,804 B2 | 7/2005 | Mutchler et al. |
| 6,924,340 B2 | 8/2005 | McGrath |

OTHER PUBLICATIONS

Stadler, et al., *Macromolecules* 2006, 39, 1474.

*Primary Examiner*—Caixia Lu
(74) *Attorney, Agent, or Firm*—John Tyrell; Jonathan L. Schuchardt

(57) ABSTRACT

A slurry process for polymerizing ethylene is disclosed. The process comprises polymerizing ethylene in a first reactor in the presence of hydrogen and a catalyst comprising an activator and a supported dimethylsilyl-bridged indeno[1,2-b] indolyl zirconium complex to produce an ethylene homopolymer, removing some of the unreacted hydrogen, and reacting the homopolymer slurry in a second reactor with ethylene and a $C_3$-$C_{10}$ α-olefin to produce polyethylene. The polyethylene has weight-average molecular weight greater than 150,000, broad molecular weight distribution, low long-chain branching, and it provides pipes or molded articles with good environmental stress crack resistance.

10 Claims, No Drawings

US 7,776,974 B2

OLEFIN POLYMERIZATION PROCESS

FIELD OF THE INVENTION

This invention relates to a slurry process for making polyethylene that is particularly useful for pipe and molding applications. The process provides polyethylene with broad molecular weight distribution and a low level of long-chain branching.

BACKGROUND OF THE INVENTION

Many olefin polymerization catalysts are known, including Ziegler-Natta catalysts. While these catalysts are inexpensive, they exhibit low activity and are generally poor at incorporating α-olefin comonomers. The large variety of active sites in Ziegler-Natta catalysts makes it difficult to control polymer architecture. To improve polymer properties, single-site catalysts, in particular metallocenes are beginning to replace Ziegler-Natta catalysts.

Slurry reactors are in widespread use for production of polyethylene homo- and copolymers. Slurry reactors include stirred-tank reactors and water-jacketed tubular reactors arranged in a series of continuous horizontal or vertical loops. A "slurry solvent" in which polyethylene has low solubility constitutes the continuous phase in such reactors. The slurry is intensely stirred in a continuous stirred-tank reactor or series of reactors or, in the case of slurry loop reactors, is driven around the loop at relatively high speed by one or more rather massive pumps. Ethylene, supported catalyst, comonomers, and processing additives are injected into the reactor where polymerization takes place, creating a slurry of polyethylene in solvent.

Multi-zone slurry polymerizations of ethylene with Ziegler-Natta catalysts are known. For example, U.S. Pat. No 4,357,448 discloses a two-step process for polymerizing ethylene in the presence of a Ziegler-Natta catalyst in combination with a reaction product of a titanium or vanadium halogen-containing compound with a first reaction product of a Grignard reagent with a hydropolysiloxane. U.S. Pat. No. 6,486,270 discloses a process to polymerize ethylene with a $C_3$-$C_{10}$ α-olefin in the presence of high levels of hydrogen to make polyethylene with a density of 0.92 to 0.94 g/cm$^3$ with multiple reaction zones using a Ziegler-Natta catalyst.

There has been some use of single-site catalysts in two reaction zones. U.S. Pat. No. 6,566,450, for example, discloses a process using bis-indenyl complexes to produce polyethylene useful as pipe resin. The polyethylene has a bimodal molecular weight distribution and a density from 0.95 to 0.96 g/cm$^3$. U.S. Pat. No. 7,423,098 discloses a multi-zone slurry process that copolymerizes ethylene with a $C_6$-$C_{10}$ α-olefin in each of the zones to produce polyethylene with a bimodal molecular weight distribution. Both make a copolymer, not a homopolymer in the first reactor and there is no teaching about resin long-chain branching or about the environmental stress crack resistance (ESCR) properties of pipe or molded products.

U.S. Pat. Nos. 6,232,260 and 6,451,724 disclose the use of transition metal catalysts based upon indenoindolyl ligands. Indenoindolyl catalysts are remarkably versatile because substituent effects and bridging changes can often be exploited to provide polymers with tailored physical or mechanical properties. Unbridged indenoindolyl complexes (as exemplified in the '260 patent) usually provide favorable activity although they sometimes fail to provide polymers having high enough molecular weights. Bridged indenoindolyl complexes (as taught, e.g., in U.S. Pat. No 6,908,972) readily copolymerize α-olefins and provide polymers with high molecular weight and varying levels of long-chain branching. For a discussion of long-chain branching in polyethylene, see Macromolecules 39 (2006) 1474 and references cited therein. U.S. Pat. Appl. Publ. Nos. 2009/0062487 and 2009/0062490 disclose a slurry process to make an ethylene copolymer with certain bridged indenoindolyl complexes including the complexes useful in the current inventive process. There is no teaching about making a homopolymer in a first reactor followed by a copolymer in a second reactor, and there is no disclosure of pipe or molded articles having improved ESCR properties. Polymers having $M_w/M_n$ values greater than 20 are not taught.

Despite the considerable experience with single-site catalysts generally and indenoindolyl catalysts in particular, there is a need for improvement. Often, polyethylene with good processability gives pipe or molded products with poor environmental stress crack resistance. A valuable process would provide polyethylene that can be readily processed in demanding applications such as pipe or large-part blow molding to provide products with good ESCR properties.

SUMMARY OF THE INVENTION

The invention is a slurry process for making polyethylene. Ethylene polymerizes in a first reactor in the presence of hydrogen and a supported bridged dimethylsilyl indeno[1,2-b]indolyl zirconium complex to produce an ethylene homopolymer with a weight-average molecular weight within the range of 15,000 and 150,000. Some of the unreacted hydrogen is removed, and the homopolymer slurry is transferred into a second reactor where it is combined and reacted with ethylene and a $C_3$-$C_{10}$ α-olefin to produce polyethylene. The process provides polyethylene with a weight-average molecular weight greater than 150,000, a broad molecular weight distribution as indicated by a $M_w/M_n$ greater than 20, and low long-chain branching as indicated by a viscosity enhancement factor of less than 2.0. Pipes and molded products from the polyethylene exhibit good ESCR properties.

The combination of attributes—comonomer incorporation in the high molecular weight portion, ability to make high-molecular-weight polymers, low long-chain branching, broad molecular weight distribution, and good environmental stress crack resistance—strikes an uncommon but valuable balance, and it requires judicious selection of process conditions and the indenoindolyl zirconium complex.

DETAILED DESCRIPTION OF THE INVENTION

Ethylene polymerizes in a first slurry reactor, preferably at a temperature within the range of 40° C. to 90° C., more preferably from 50° C. to 85° C. The polymerization is performed in the presence of hydrogen and a catalyst comprising an activator and a supported dimethyl silyl-bridged indeno[1, 2-b]indolyl zirconium complex to produce an ethylene homopolymer. The homopolymer has a weight-average molecular weight within the range of 15,000 and 150,000, preferably within the range of 25,000 and 50,000. The molecular weight is controlled by adding hydrogen into the process. Increased levels of hydrogen further reduce the molecular weight.

Some of the unreacted hydrogen is removed and the homopolymer slurry is transferred into a second reactor where it is combined and reacted with ethylene and a $C_3$-$C_{10}$ α-olefin to produce polyethylene. Suitable $C_3$-$C_{10}$ α-olefins include, for example, propylene, 1-butene, 1-hexene, 1-octene, and mixtures thereof. Preferred $C_3$-$C_{10}$ α-olefins are 1-butene, 1-hexene, and 1-octene.

Complexes useful for process of the invention are dimethylsilyl-bridged indeno[1,2-b]indolyl zirconium complexes. Not all complexes of this type are suitable, however. Suitable complexes have a structure selected from the group consisting of:

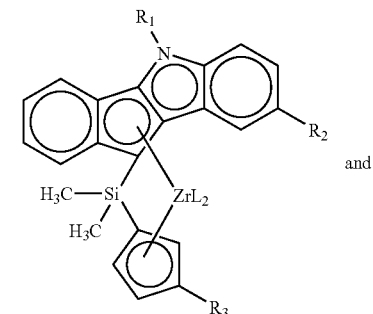

and

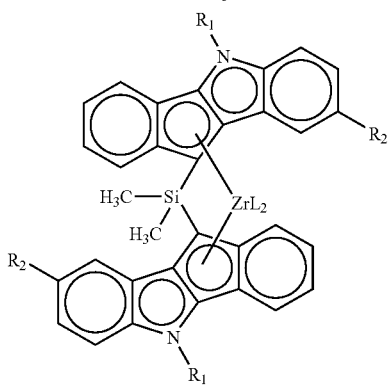

wherein each $R_1$ is independently selected from the group consisting of $C_1$-$C_{10}$ hydrocarbyl; each $R_2$ is independently selected from the group consisting of H, F, and $C_1$-$C_{10}$ hydrocarbyl; $R_3$ is $C_4$-$C_{10}$ hydrocarbyl; and each L is independently selected from the group consisting of halide, alkoxy, aryloxy, siloxy, alkylamino, and $C_1$-$C_{30}$ hydrocarbyl. Preferably, $R_1$ is methyl. Preferably, $R_2$ is hydrogen or methyl, more preferably methyl. Preferably, $R_3$ is an n-alkyl group, more preferably n-butyl.

As those skilled in the art will appreciate, the complexes shown above might be prepared as a single stereoisomer or as a mixture of stereoisomers. Throughout this patent application, a given structure is meant to encompass all possible stereoisomers of that complex, alone or in combination, and no structure is intended to be limited to any one particular stereoisomer. Preferably, the process uses a mixture of stereoisomers. When the complex has the structure

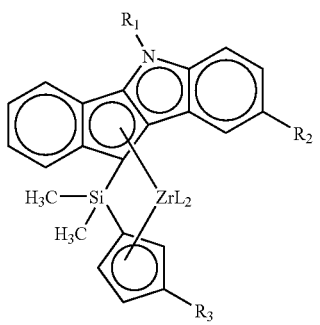

there can be two pairs of enantiomers:

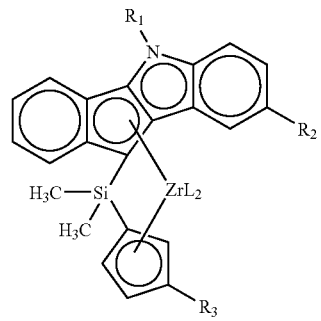

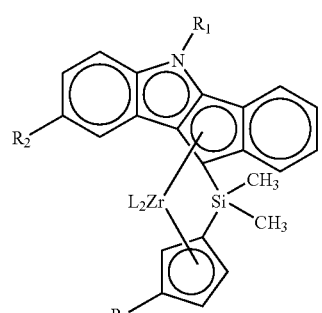

Enantiomer pair

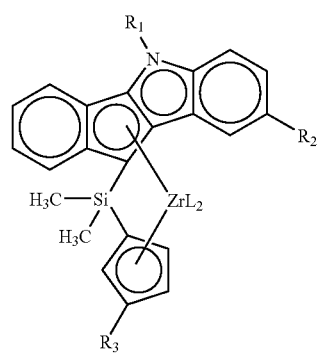

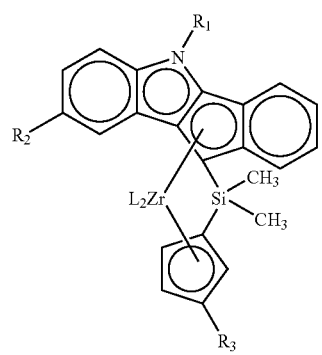

Enantiomer pair

For the structure

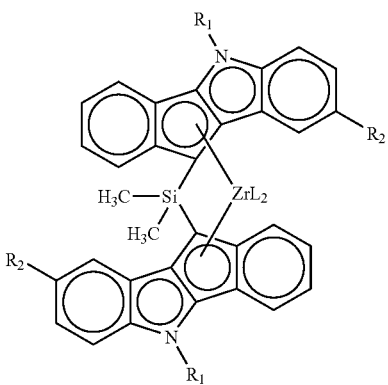

we can have a pair of enantiomers (a racemic mixture or "rac") and a meso form:

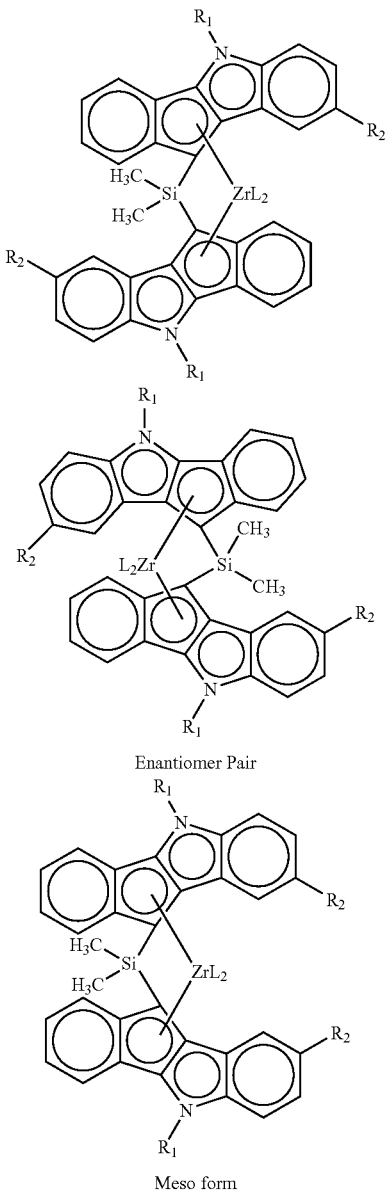

Enantiomer Pair

Meso form

Preferably, the mixture of stereoisomers contains a ratio of one pair of enantiomers (racemic mixture 1 or "rac 1") to the other pair of enantiomers (racemic mixture 2 or "rac 2") or of one pair of enantiomers to the meso stereoisomer rac:meso of from 0.1:1 to 1:0.1, more preferably from 0.5:1 to 1:0.5.

Indeno[1,2-b]indolyl ligands are conveniently generated by deprotonating an indeno[1,2-b]indole compound using a potent base. Suitable indeno[1,2-b]indolyl ligands and ways to name, synthesize, and incorporate them into a dimethylsilyl-bridged zirconium complex have been described in considerable detail elsewhere; see, for example, U.S. Pat. Nos. 6,232,260, 6,908,972 and 6,559,251, the teachings of which are incorporated herein by reference, and the references cited therein.

Example 1 of U.S. Pat. No. 6,908,972 illustrates a particularly useful way to prepare complexes suitable for use in the inventive process. Usually, the indeno[1,2-b]indole precursor having the desired substituents is prepared by reacting the appropriate 1-indanone and arylhydrazine precursors. The indole nitrogen can then be alkylated. Deprotonation followed by reaction with dichlorodimethylsilane conveniently attaches silicon at the indenyl methylene. Reaction of the monochlorosilane with a cyclopentadienyl or indenoindolyl anion provides the desired bridged ligand precursor. Double deprotonation and combination of the resulting dianion with a zirconium source affords the ultimate target, a dimethylsilyl-bridged indeno[1,2-b]indolyl zirconium complex.

An activator is used in the polymerization. The activator helps to ionize the zirconium complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethylaluminum chloride, trimethylaluminum, triisobutyl-aluminum), and the like. Suitable activators include salts that contain non-nucleophilic anions. These compounds generally consist of bulky ligands attached to boron or aluminum. Examples include lithium tetrakis(pentafluoro-phenyl)borate, lithium tetrakis(pentafluorophenyl)aluminate, anilinium tetrakis(pentafluorophenyl)borate, trityl tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference. Alumoxane activators, such as MAO, are preferred.

The optimum amount of activator needed relative to the amount of zirconium complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of zirconium. When the activator is an organoborane or an ionic borate or aluminate, the amount used will be within the range of about 0.01 to about 5000 moles, preferably from about 0.1 to about 10 moles, of activator per mole of zirconium.

The catalyst comprises a supported zirconium complex. The support is preferably a porous material such as inorganic oxides and chlorides, and organic polymer resins. Preferred inorganic oxides include oxides of Group 2, 3, 4, 5, 13, or 14 elements. Preferred supports include silicas, aluminas, silica-aluminas, magnesias, titanias, zirconias, magnesium chloride, and crosslinked styrenic resins. Most preferred is silica. The silica is preferably treated thermally, chemically, or both prior to use to reduce the concentration of surface hydroxyl groups. Thermal treatment consists of heating (or "calcining") the silica in a dry atmosphere at elevated temperature, preferably greater than about 100° C., and more preferably from about 150° C. to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference. The amount of complex added is preferably from 0.01 to 0.5 mmol per gram of support.

In one suitable catalyst preparation method, a solution of the complex is combined with the support. The mixture is stirred in an inert atmosphere at a temperature within the range of 0° C. to 120° C., more preferably from 20° C. to 40° C. The optimum stirring time will vary somewhat, depending upon the amounts of solvent and support, but it should be long enough to ensure good mixing. Preferably, the stirring time is from 2 to 60 minutes. Stirring longer than 60 minutes should not decrease activity, but it is unnecessary. Stirring 30 minutes at room temperature is convenient and gives good results. If a large amount of solvent is used, the mixture is a slurry and it is convenient to remove some of the solvent to prepare a free-flowing solid. This can be done at room temperature by applying a vacuum. Alternatively, an incipient wetness technique can be used in which a small amount of solvent is used to dissolve the complex and the solution is added to the support material. The mixture remains a free-flowing solid without solvent removal. The mixture can be used as is or residual solvent may be removed.

Different methods for addition of the activator and for combining the complex with the support may be used. In one suitable method, the activator is premixed with the support and the complex is added to the mixture of support and activator. Optionally, the activator is combined with the complex and the mixture of activator and complex is added to the support. Alternatively, a portion of the activator is combined with the support and a mixture of the complex and the remaining amount of the activator is added to the support.

Optionally, the catalyst comprises an activator and a supported, dimethylsilyl-bridged indeno[1,2-b]indolyl zirconium complex in combination with a second supported single-site complex. The second complex can be useful for certain applications if specific polyethylene properties are needed, such as further broadening of the molecular weight distribution. The second complex can be any single-site complex. Many are known to those skilled in the art and they include bridged, non-bridged, and open architecture complexes. Preferably, the second complex is a zirconium or titanium complex. Exemplary ligands for the second complex are substituted and unsubstituted cyclopentadienyl, indenyl, fluorenyl, boraaryl, indenoindolyl, or the like. When a second complex is used, it is preferably less than 30 mole percent, more preferably less than 10 mole percent of the total amount of complex used.

Complex concentrations used for the olefin polymerization depend on many factors. Preferably, however, the concentration ranges from about 0.01 micromoles zirconium per liter to about 100 micromoles per liter. Olefin partial pressures normally range from about 0.1 MPa to about 350 MPa. More preferred is the range from about 0.1 MPa to about 7 MPa. Polymerization times depend on the type of process, the complex concentration, and other factors. Generally, polymerizations are complete within several seconds to several hours.

After polymerizing ethylene in a first slurry reactor in the presence of hydrogen, some of the unreacted hydrogen is removed from the homopolymer slurry. Hydrogen can be removed by any desired method. Two convenient and useful methods are described in U.S. Pat. Nos. 6,921,804 and 6,924,340, the teachings of which are incorporated herein by reference. The amount of unreacted hydrogen removed depends upon the desired molecular weight of the polyethylene. The higher the desired polyethylene molecular weight, the greater the amount of hydrogen that should be removed.

After hydrogen removal, the homopolymer slurry is transferred into a second reactor. The first and second reactors are typically operated in series. They can be of any type suitable for a slurry process. The first and second reactor can be of the same or different configuration. Suitable reactor types include continuous stirred-tank reactors, horizontal loop reactors, vertical loop reactors, or the like. The process can be batch, semibatch, or continuous. A continuous process is preferred.

In the second reactor, the homopolymer slurry is combined and reacted with ethylene and a $C_3$-$C_{10}$ α-olefin, preferably at a temperature within the range of 40° C. to 90° C., more preferably from 50° C. to 85° C., to produce polyethylene. The polymer has a weight-average molecular weight greater than 150,000, a broad molecular weight distribution as indicated by a $M_w/M_n$ greater than 20, and low long-chain branching as indicated by a viscosity enhancement factor of less than 2.0. Pipes and molded articles from the polyethylene have good ESCR properties.

The inventive slurry process provides polyethylene having a weight-average molecular weight greater than 150,000. Too often, a process is unable to provide polyethylene with high enough molecular weight (or low enough melt index), and this limits its usefulness. The inventive process can provide the desirable high molecular weight. The polyethylene has broad molecular weight distribution as indicated by a $M_w/M_n$ greater than 20. High molecular weight and a broad molecular weight distribution help processability for many applications, including pipe and blow-molded parts, particularly large parts.

Resins of the invention provide pipe and molded parts with excellent environmental stress crack resistance (ESCR). Stress cracking according to ASTM D883 is "an external or internal crack in a plastic caused by tensile stresses less than its short-term mechanical strength." Environmental stress cracking typically occurs in the presence of surface wetting agents such as alcohols, soaps, surfactants, and others. Thus, high resistance to environmental stress cracking is a particularly important performance criterion for polyethylene to be used in pipe and large-part blow molded parts. ESCR is measured by a variety of different analytical methods, including ASTM D-5397. The ASTM D-5397 test consists of subjecting notched specimens to a constant load in the presence of a surface-active agent at elevated temperatures. Typically, the ESCR value is measured in either 10% aqueous or 100% Igepal® nonylphenoxypoly(ethyleneoxy)ethanol solution. In general, resins of the invention provide enhanced ESCR compared with that of conventional ethylene copolymer resins of similar density and melt index.

The process produces polyethylene with little or no long-chain branching. As described in Macromolecules 39 (2006) 1474, rheological measurements can be used to estimate the amount of long-chain branching. At low shear rates, the viscosity of polyethylene with long-chain branching is higher than the viscosity of linear polyethylene of equivalent molecular weight. We can use a viscosity enhancement factor (VEF) as an indication of long-chain branching. The viscosity enhancement factor can be determined from the ratio of the measured viscosity at a fixed temperature and frequency to the viscosity predicted for linear polyethylene of equivalent molecular weight. Preferably, the temperature used is 190° C. and the frequency is 0.025 rad/s. For the purpose of this application, by "viscosity enhancement factor" we mean the ratio of the measured viscosity at 190° C. and a frequency of 0.025 rad/s to the viscosity predicted for linear polyethylene of equivalent molecular weight. The viscosities of more than forty linear polyethylene samples of varying weight-average molecular weight were measured to develop the relationship between $M_w$ and viscosity at 0.025 rad/s. The viscosity prediction for linear polyethylene=$(2.1 \times 10^{-14})(M_w^{3.66})$. A linear polyethylene will have a viscosity enhancement factor of about 1, while a sample of polyethylene known to have substantial long-chain branching had a viscosity enhancement factor of 15. By "low long-chain branching," we mean a viscosity enhancement factor of less than 2.0. Such polyethylenes are mostly linear, and the rheological effect of any long-chain branching is insubstantial. For more details about how to measure and compute VEF, see U.S. Pat. Appl. Publ. No. 2009/0061135, the teachings of which are incorporated herein by reference.

Preferably, the polyethylene has a density between 0.945 and 0.955 g/cm³. This density makes the polyethylene particularly suitable for certain pipe and large-part blow molding applications.

The following examples merely illustrate the invention. Those skilled in the art will recognize many variations that are within the spirit of the invention and scope of the claims.

EXAMPLE 1

A 1-L flask is charged with lithium n-butylcyclopentadienide (15.6 g, 0.121 mol) and 5,8-dimethyl-5,10-dihydroindeno[1,2-b]indolyl-dimethylsilyl chloride (39.7 g, 0.120 mol). Tetrahydrofuran (120 mL) is added at room temperature to give a purple mixture. The volatiles are removed under vacuum after 48 hours, and hexanes (200 mL) are added and maintained overnight. The mixture is filtered over a pad of Celite, and the volatiles are removed under vacuum to afford an oily residue (49.3 g, 0.121 mol). The oil is dissolved in diethyl ether (600 mL), and n-butyllithium (105 mL, 2.5 M, 0.261 mol) is added dropwise and stirred overnight. A precipitate occurs, and the solids are filtered and washed with diethyl ether (approximately 100 mL) followed by hexanes (150 mL). The solid dilithium salt is dried under vacuum (43.5 g, 85.6%).

Zirconium tetrachloride (6.28 g, 0.0270 mol) is suspended in methylene chloride (200 mL), and diethyl ether (100 mL) is added slowly to give a clear solution. A portion of the dilithium salt (11.4 g, 0.0271 mol) is added as a solid with vigorous stirring, and the mixture turns red. The stirring is maintained overnight and the slurry is filtered. The filtrate is concentrated to approximately 175 mL, and the resulting solid precipitate is isolated by filtration and dried (0.135 g). The second filtrate is further concentrated to approximately 100 mL and maintained at room temperature overnight. A second crop is filtered and dried (1.65 g). The ¹H NMR spectra reveals that solid precipitate and the second crop are each the desired dimethylsilyl-bridged indeno[1,2-b]indolyl zirconium dichloride, i.e., complex 1. The solid precipitate has a molar ratio of rac 1:rac 2 stereoisomers of 1:1 and the second crop has a rac1:rac 2 ratio of 2:1.

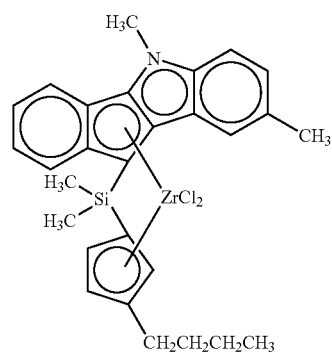

Support and Activation of Complex 1: Methylalumoxane (2.2 mL of 4.21 M solution in toluene, product of Albemarle) is added at room temperature to a slurry of 0.75 g of silica (G3, available from Fuji Silysia Chemical Ltd., calcined at 250° C. for 12 hours) in 4 mL of anhydrous toluene. The resulting stirred slurry is heated at 80° C. for two hours and cooled to ambient temperature. A 0.0926 mmole sample of the solid precipitate prepared above (rac 1:rac 2 ratio=1:1), complex 1, (Al/Zr=100) is added to the slurry and stirred for 2 hours at ambient temperature. An aliquot of this catalyst slurry is used while fresh (1 to 3 days) in polymerization tests.

Slurry Polymerization with Supported Complex 1:

To simulate the material made in the first reactor, ethylene is polymerized in the presence of hydrogen to make an ethylene homopolymer. Isobutane (395 g), Armostat 710 fatty amine (product of Akzo Nobel) (0.5 mL of a 1% by weight solution) and 1.9 M triisobutylaluminum solution in hexanes (1.5 mL) are added to a dry, nitrogen-purged stainless-steel stirred and jacketed autoclave reactor. Hydrogen is added to achieve a final vapor concentration of approximately 0.5 mol %. The reactor is heated to 70° C. and pressurized to 2.1 MPa with ethylene. The polymerization reaction is started by injecting an aliquot of catalyst sample. The temperature is maintained at 70° C. throughout the test. The ethylene and hydrogen are supplied on demand to maintain the reactor pressure of 2.1 MPa and the desired hydrogen concentration. The polymerization is terminated by venting the autoclave. The polyethylene sample is dried and tested.

The viscosity enhancement factor (VEF) is determined to be 1.1. By GPC, the polyethylene has a weight-average molecular weight ($M_w$) of 36,000. The melt index (MI), measured according to ASTM D1238, Condition E, is 116 dg/min. Density by ASTM D-1505-96: 0.974 g/cm³.

To simulate the material made in the second reactor, the polymerization is repeated with less hydrogen and with 1-butene. The polyethylene copolymer has VEF=1.7; $M_w$=331,000; $M_w/M_n$=3.9; and density=0.918 g/cm³. Branching is determined by FT-IR spectroscopy to be 10 tertiary carbons per 1000 carbons.

To simulate the overall product of the two-reactor process, the homopolymer and copolymer are blended on a Haake minilab microcompounder (available from Thermo Fisher Scientific Co.). The microcompounder is based on a conical twin-screw compounder with an integrated backflow channel. A weight ratio of homopolymer:copolymer of 58:42 is used to target a blend density of 0.950 g/cm$^3$. The actual measured density is 0.950 g/cm$^3$; VEF=1.2; $M_w$=190,000; $M_w/M_n$=27; and MI=19 by ASTM D1238, Condition F.

For ESCR testing, the blend is compression molded into 1.9 mm plaques and die cut into test specimens according to ASTM D5397. Five specimens are notched and immersed in a bath containing a 10% by weight aqueous solution of Igepal CO-6305® (nonylphenoxypoly(ethyleneoxy)ethanol) while subjected to a tensile stress of 6.9 MPa. The bath is maintained at a constant temperature of 50° C. A timing clock automatically records the failure time of the test specimens to the nearest 0.1 hour. The average failure time for the five specimens is 2063 hours.

COMPARATIVE EXAMPLE 2

Complexes 2a and 2b are prepared and supported in similar fashion as complex 1.

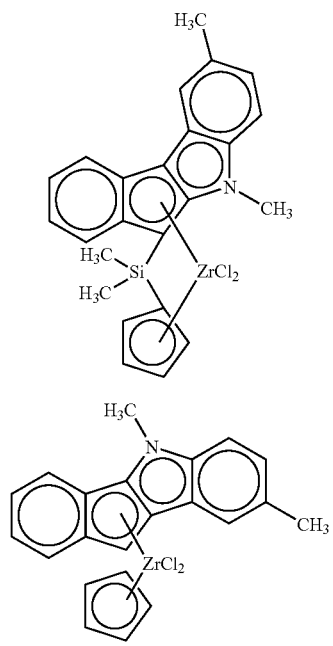

The complexes are used in a 1:1 weight ratio to make an ethylene homopolymer having $M_w$=35,000; MI=122; VEF=1.0; and density=0.975 g/cm$^3$. A 1-butene copolymer is made with $M_w$=232,000; VEF=3.1; branching=2.5 tertiary carbons per 1000 carbons; and density=0.931 g/cm$^3$.

A blend is prepared as in Example 1 using a weight ratio of homopolymer: copolymer of 44:56 to target a blend density of 0.950 g/cm$^3$. Measured density=0.951 g/cm$^3$; VEF=1.7; $M_w$=153,000; $M_w/M_n$=14; and MI=20 by ASTM D1238, Condition F. ESCR testing is done as in Example 1. Each of the 5 samples fails within 30 hours.

The polymer blend in Example 1 has similar density and processability (molecular weight and melt index) as the Comparative Example 2 blend, but its compression molded product has remarkably improved environmental stress crack resistance. The blend simulating a polymer composition made by the process of the invention provides more than a twenty-fold improvement in ESCR.

Comparative Example 2 shows that this result is unexpected. A similar mixture of indenoindolyl complexes fails to give a blend that provides the needed improvement in the ESCR properties of the molded article.

EXAMPLE 3

A 1-L flask equipped with a stir bar is charged with 5,8-dimethyl-5,10-dihydroindeno[1,2-b]indole (26.5 g, 114 mmol) and diethyl ether (240 mL). The flask is equipped with a straight-tip gas inlet adapter with rubber septum and a reflux condenser. The mixture is cooled to 0° C., and n-butyllithium (75.0 mL, 1.6 M in hexanes, 120 mmol) is added by cannula. The mixture initially turns bright yellow, then clear orange when base addition is complete. After 20 minutes, a thick yellow paste forms. The mixture is warmed to room temperature and maintained under nitrogen overnight. A solution of dichlorodimethylsilane (7.0 mL, 58 mmol) in diethyl ether (120 mL) is added at room temperature. The mixture warms, and the slurry darkens. Once addition is complete, the mixture is brought to reflux for 3 hours and is then cooled to room temperature. Water (250 mL) is added, a solid separates from the organic layer, and the mixture is filtered. The solid is washed with diethyl ether (300 mL) and dried under vacuum to afford a gray solid (27.8 g, 46.9%).

A portion of the gray solid (3.56 g, 6.80 mmol) is slurried in 100 mL of diethyl ether and n-butyllithium (6.0 mL, 2.5 M in hexanes, 15.0 mmol) is added by syringe to the slurry. The mixture is maintained at room temperature overnight and the color changes from yellow to orange. Methylene chloride (30 mL) is added to zirconium tetrachloride (1.58 g, 6.79 mmol) followed by diethyl ether (50 mL) to give a slightly turbid mixture. The dianion is added and the mixture turns deep magenta and a precipitate forms. The mixture is stirred for 48 hours. The mixture is filtered and the dark purple residue is extracted with methylene chloride (approximately 50 mL) and filtered. The filtrate is concentrated to approximately 70 mL and maintained to form a precipitate, which is filtered and dried. The $^1$H NMR spectra reveals that washed residue and the precipitate are each the complex, 1,1-dimethylsilyl-bis(5, 10-dihydrido-5,8-dimethyl-indeno[1,2-b]indolyl)zirconium dichloride 3. The washed residue has a molar ratio of rac (racemic mixture):meso stereoisomers of 1:1.5. The precipitate has a rac:meso ratio of 1:1 and is used in the following polymerization.

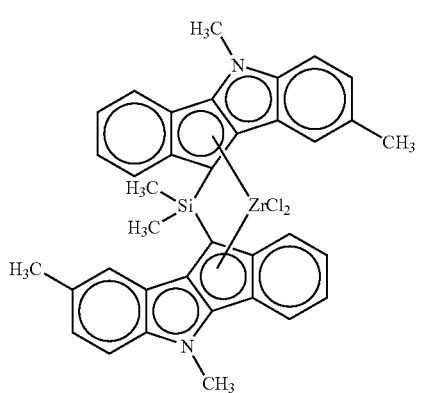

Support and Activation of Complex 3: Methylalumoxane (2.2 mL of 4.21 M solution in toluene, product of Albemarle) is added at room temperature to a slurry of 0.75 g of silica (G3, available from Fuji Silysia Chemical Ltd., calcined at 250° C. for 12 hours) in 4 mL of anhydrous toluene. The resulting stirred slurry is heated at 80° C. for two hours and cooled to ambient temperature. A 0.0926 mmole sample of dry complex, 3 (rac:meso=1:1) (Al/Zr=100) is added to the slurry and stirred for 2 hours at ambient temperature. An aliquot of this catalyst slurry is used while fresh (1 to 3 days) in polymerization tests.

The complex is supported and used in slurry polymerizations in similar fashion as in Example 1. A blend of homopolymer and copolymer should provide molded articles having superior ESCR properties similar to those produced in Example 1.

The preceding examples are meant only as illustrations. The following claims define the invention.

What is claimed is

1. A slurry process for making polyethylene useful in pipe or molding applications and having low long-chain branching and broad molecular weight distribution, said process comprising:
   (a) in a first reactor, polymerizing ethylene in the presence of hydrogen and a catalyst comprising an activator and a supported, dimethylsilyl-bridged indeno[1,2-b]indolyl zirconium complex to produce a slurry comprising an ethylene homopolymer having a weight-average molecular weight within the range of 15,000 and 150,000;
   (b) removing at least some of the unreacted hydrogen from the slurry; and
   (c) in a second reactor, reacting the slurry from step (b) with ethylene and a $C_3$-$C_{10}$ α-olefin to produce polyethylene with a weight-average molecular weight greater than 150,000, an $M_w/M_n$ greater than 20, and a viscosity enhancement factor of less than 2.0; wherein the complex has a structure selected from the group consisting of:

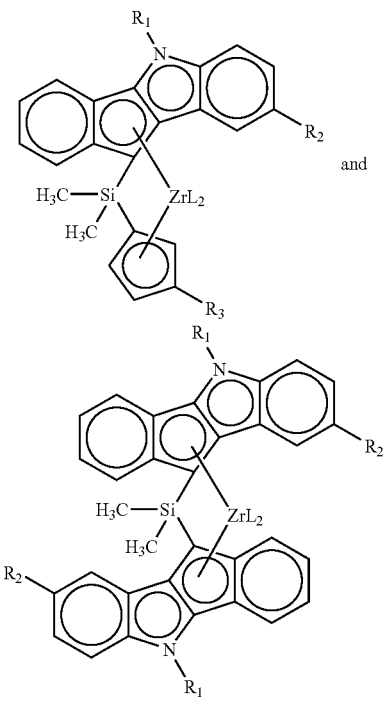

and wherein each $R_1$ is independently a $C_1$-$C_{10}$ hydrocarbyl; each $R_2$ is independently selected from the group consisting of H, F, and $C_1$-$C_{10}$ hydrocarbyl; $R_3$ is a $C_4$-$C_{10}$ hydrocarbyl; and each L is independently selected from the group consisting of halide, alkoxy, aryloxy, siloxy, alkylamino, and $C_1$-$C_{30}$ hydrocarbyl.

2. The process of claim 1 wherein the ethylene homopolymer has a weight-average molecular weight within the range of 25,000 and 50,000.

3. The process of claim 1 wherein the polymerization in each of the first and second reactors is performed at a temperature within the range of 40° C. to 90° C.

4. The process of claim 1 wherein the polyethylene has a density within the range of 0.945 and 0.955 g/cm³.

5. The process of claim 1 wherein each of $R_1$ and $R_2$ is methyl.

6. The process of claim 5 wherein $R_3$ is n-butyl.

7. The process of claim 1 wherein the catalyst comprises an activator and a supported, dimethylsilyl-bridged indeno[1,2-b]indolyl zirconium complex in combination with a second supported single-site complex.

8. The process of claim 1 wherein the complex is a mixture of diastereomers.

9. The process of claim 1 wherein the complex has the structure:

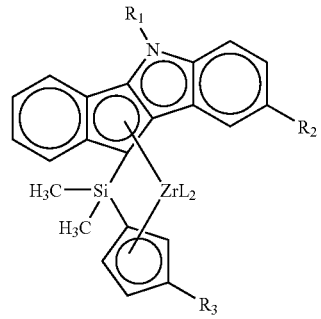

wherein each $R_1$ is independently a $C_1$-$C_{10}$ hydrocarbyl; each $R_2$ is independently selected from the group consisting of H, F, and $C_1$-$C_{10}$ hydrocarbyl; $R_3$ is a $C_4$-$C_{10}$ hydrocarbyl; and each L is independently selected from the group consisting of halide, alkoxy, aryloxy, siloxy, alkylamino, and $C_1$-$C_{30}$ hydrocarbyl and the molar ratio of rac1:rac2 stereoisomers in the complex is from 0.1:1 to 1:0.1.

10. The process of claim 1 wherein the complex has the structure:

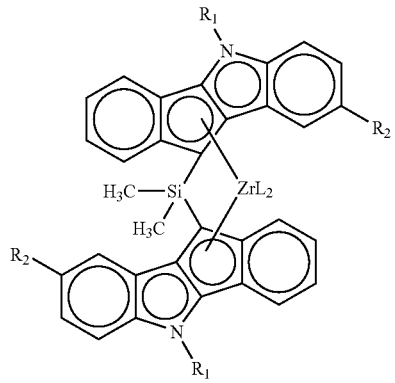

wherein each $R_1$ is independently a $C_1$-$C_{10}$ hydrocarbyl; each $R_2$ is independently selected from the group consisting of H, F, and $C_1$-$C_{10}$ hydrocarbyl; and each L is independently selected from the group consisting of halide, alkoxy, aryloxy, siloxy, alkylamino, and $C_1$-$C_{30}$ hydrocarbyl and the molar ratio of rac:meso stereoisomers in the complex is from 0.1:1 to 1:0.1.

* * * * *